United States Patent [19]

Maycock et al.

[11] Patent Number: 5,076,410
[45] Date of Patent: Dec. 31, 1991

[54] FRICTION FACING MATERIAL AND CARRIER ASSEMBLY

[75] Inventors: Ian C. Maycock, Leamington Spa; David C. Williams, Llanfaireechan, both of United Kingdom

[73] Assignee: Automotive Products plc, United Kingdom

[21] Appl. No.: 644,409

[22] Filed: Jan. 22, 1991

Related U.S. Application Data

[63] Continuation of Ser. No. 488,086, filed as PCT/GB88/01045, Nov. 30, 1988, published as WO89/05927, Jun. 29, 1989, abandoned.

[30] Foreign Application Priority Data

Dec. 24, 1987 [GB] United Kingdom ............... 8730164

[51] Int. Cl.$^5$ .............................................. F16D 69/04
[52] U.S. Cl. ............................. 192/107 R; 192/107 C; 188/218 XL; 156/291
[58] Field of Search ..................... 192/107 R, 107 C; 156/290, 291, 292; 188/73.2, 218 XL

[56] References Cited

U.S. PATENT DOCUMENTS

| | | | |
|---|---|---|---|
| 2,253,316 | 8/1941 | Armitage | 192/107 R |
| 3,231,058 | 1/1966 | Batcheler et al. | 192/107 R |
| 3,520,390 | 2/1968 | Bentz | 192/107 R |
| 4,529,079 | 7/1985 | Albertson | 192/107 C |
| 4,646,900 | 3/1987 | Crawford et al. | 192/107 R |
| 4,821,860 | 4/1989 | Crawford et al. | 192/107 C |

FOREIGN PATENT DOCUMENTS

| | | | |
|---|---|---|---|
| 0252583 | 1/1988 | European Pat. Off. | |
| 86502 | 1/1966 | France | |
| 611823 | 5/1946 | United Kingdom | |
| 2027822 | 2/1980 | United Kingdom | 188/73.2 |
| 2170871 | 8/1986 | United Kingdom | 192/107 R |
| 2191830A | 12/1987 | United Kingdom | |

Primary Examiner—Richard Lorence
Attorney, Agent, or Firm—Davis, Bujold & Streck

[57] ABSTRACT

A friction facing material and carrier assembly (2) for inclusion in a clutch driven plate. The assembly (2) comprises a metal carrier plate (4) having resiliently pliable spokes or paddles (14) at its outer periphery. Two annuli (20, 22) of friction material forming facings are bonded to opposite sides of the paddles (14) by a respective layer of an elastomeric material, for example a silicone rubber. Each elastomeric layer is in the form of a spiral stripe extending substantially continuously from the outer to the inner periphery of the respective friction facing. For example, the facing (22) is bonded by an elastomeric spiral having three turns (24A, 24B) and 24C. Preferably in a complete assembly (2), both spirals of elastomeric material are of the same hand with turns of one spiral opposite gaps between adjacent turns of the other spiral.

24 Claims, 3 Drawing Sheets

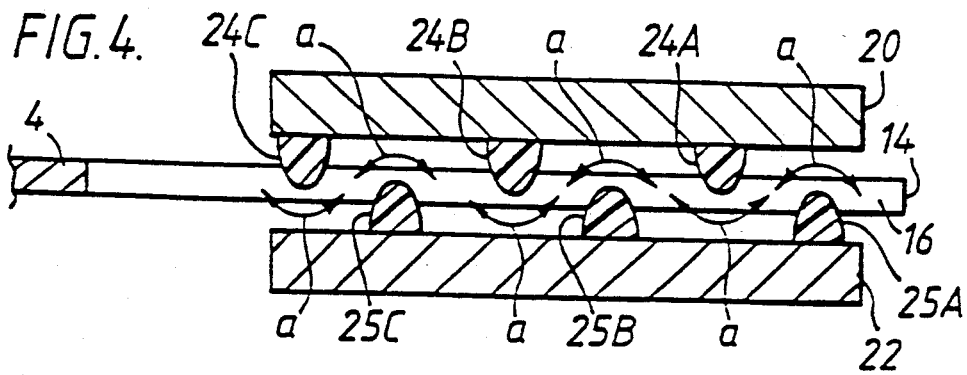
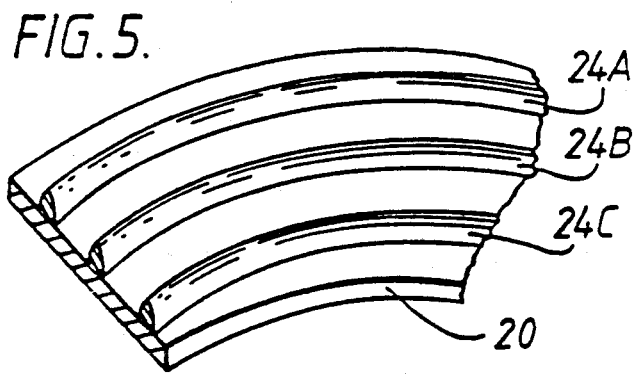
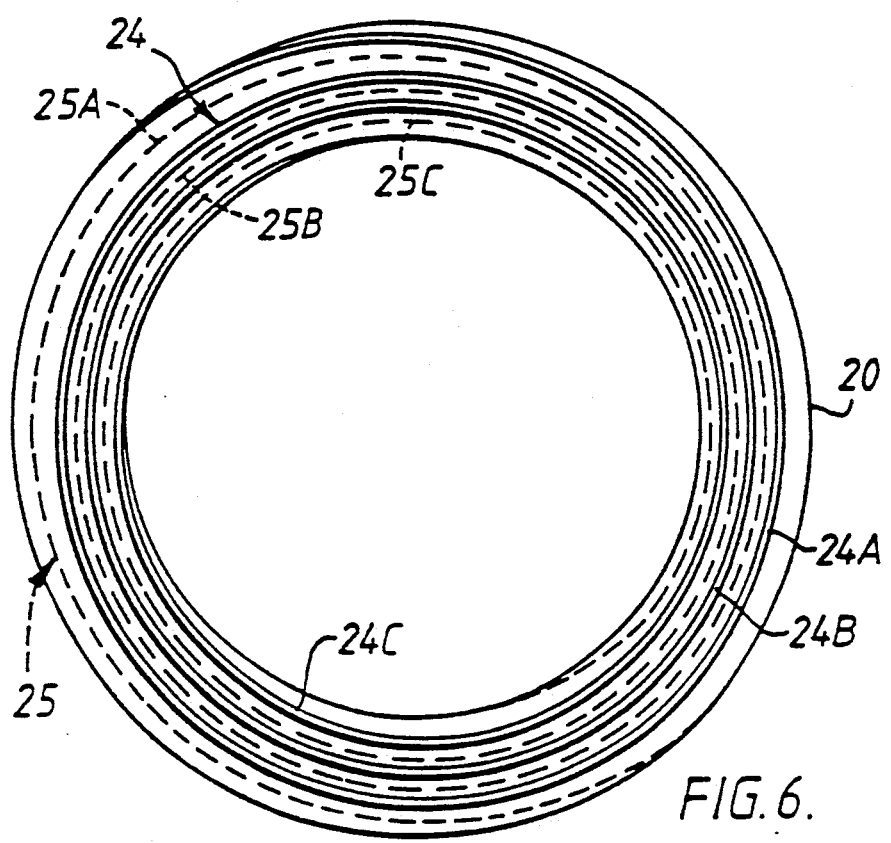

FRICTION FACING MATERIAL AND CARRIER ASSEMBLY

This is a continuation of copending application Ser. No. 07/488,086 filed on June 22, 1990 and now abandoned.

This invention relates to a friction facing material and carrier assembly for a clutch driven plate, and also relates to a method of making such an assembly.

In particular, though not exclusively, the clutch driven plate may be used in a clutch for a motor vehicle.

The friction facing and carrier assembly concerned is of a type (hereinafter called "the type referred to") comprising at least one annular array of friction material adhered to a carrier by elastomeric material, and in use said assembly being intended for rotation about an axis.

It has already been proposed to apply the elastomeric material in the form of radially spaced stripes disposed as substantially concentric circles substantially centred on said axis. Each stripe is substantially continuous with a view of maximising the bond strength of the elastomeric material. Unfortunately a plurality of nozzles are needed each for extruding a respective stripe onto the annular array of friction material rotating about the axis. Also the starting and finishing of extruding can be difficult to control precisely, and thus excessive blobs of elastomeric material may be deposited on the friction material.

One object of the invention is to provide an assembly of the type referred to in which said drawbacks may be avoided or at least mitigated.

According to one aspect of the invention a friction facing and carrier assembly of the type referred to is characterised in that said elastomeric material is disposed as a stripe substantially in a spiral form extending about said axis, and from its radially outermost end to its radially innermost end said spiral is substantially continuous.

According to another aspect of the invention there is provided a method of making a friction facing and carrier assembly for a clutch driven plate, the assembly being intended for rotation about an axis, the method comprising applying elastomeric material to an annular array of friction material and applying the friction material to a carrier so that the friction material is adhered to the carrier by the elastomeric material, characterised in that the elastomeric material is applied so as to form a substantially continuous spiral stripe extending about the axis.

In a preferred embodiment the spiral stripe is completely continuous from one end to the other end of the spiral.

Preferably at least one passage is provided which allows flow of gas into and out of a space between two adjacent turns of the spiral stripe of elastomeric material during curing or vulcanizing of the elastomeric material which causes a said friction facing to become bonded to the carrier. Then each passage permits exposure (in said space) of the two turns of elastomer to the ambient atmosphere which may be heated and/or comprise a mixture of gases and vapours intended to promote said curing, and, very importantly, the or each passage can allow the escape of gases emitted by the elastomeric material during the course of curing.

Although a porous, or microporous elastomer might be used, preferably the elastomer is an homogeneous solid.

The elastomer may be a silicone rubber which vulcanises at room temperature so that distortion by vulcanisation heating may be avoided.

The elastomer may have the following physical specification:

| | |
|---|---|
| Durometer shore A Hardness | 45 |
| Tensile strength | 28.12 kg/cm2 (400 psi) |
| Elongation | 300% |

The invention will now be further described by way of example, with reference to the accompanying drawings in which:

FIG. 4 is a section, on an enlarged scale, on line IV—IV in FIG. 1,

FIG. 5 is a fragment, on an enlarged scale, of a friction facing in the course of a method of making the assembly in FIG. 1;

FIG. 6 is a plan view of a friction facing with a spiral stripe of elastomer to be used in the friction material and carrier assembly shown in FIG. 1:

In the drawings like or comparable parts have the same reference numerals.

Figure 1:
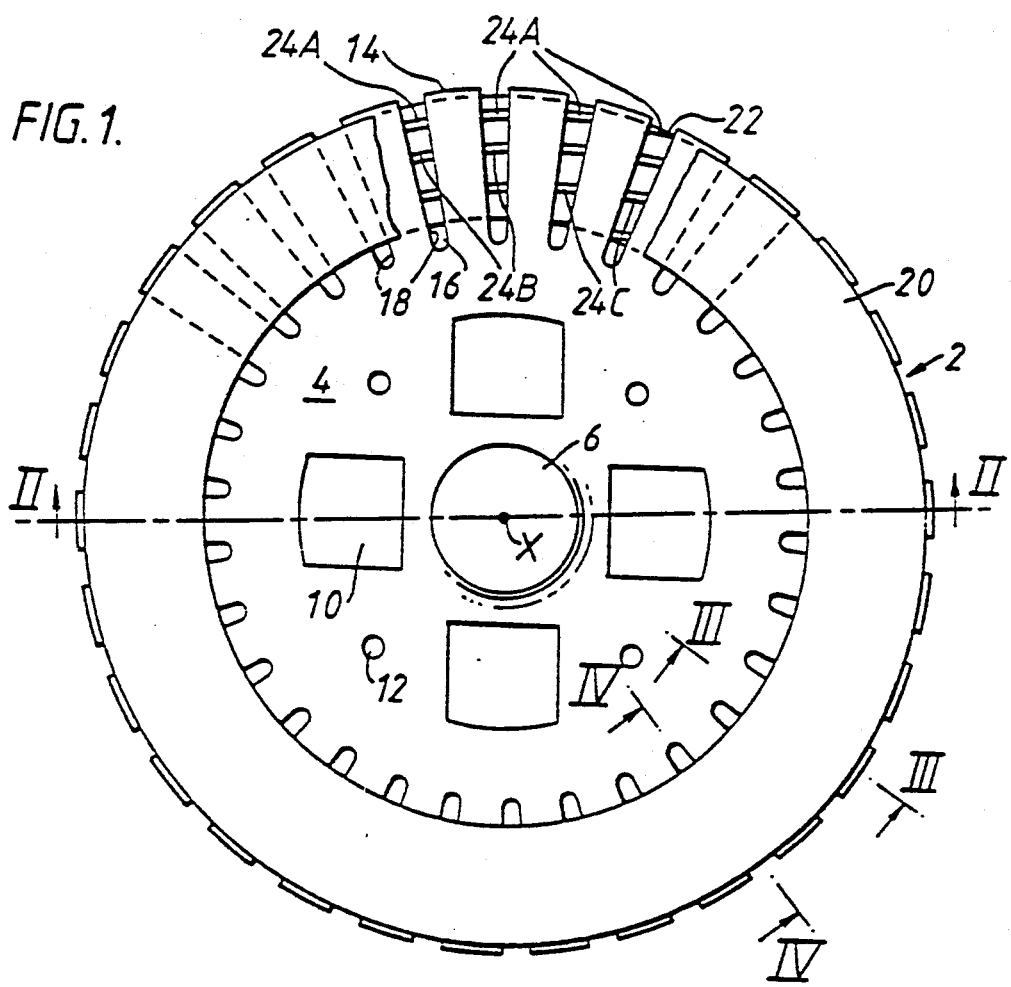
FIG. 1 is a plan view of a fragment of an embodiment of a friction material and carrier assembly formed according to the invention and intended to form a part of a dry friction clutch driven plate.
Figure 2:
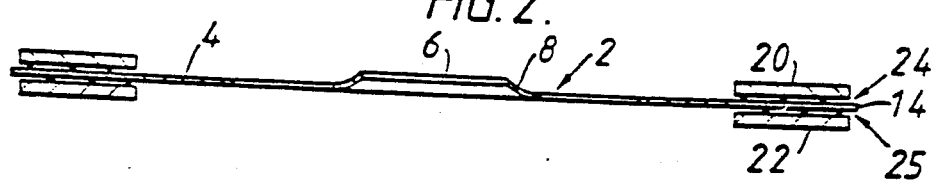
FIG. 2 is a section on line II—II in FIG. 1.

With reference to the drawings a friction material and carrier plate assembly is shown at 2 intended to form part of a friction clutch driven plate which can be used in a clutch, for example, a diaphragm spring clutch which may be used, for example in a motor vehicle.

The assembly comprises a mainly flat steel carrier plate 4 of disc form centrally apertured at 6 to fit, for example, on an internally splined hub (not shown) known per se when the assembly is incorporated in a said driven plate. Aperture 6 is surrounded by a flared or Belleville marginal portion 8. Also the carrier plate is formed with windows 10 for torsional vibration damping springs (not shown) known per se and holes 12 for stop rivets (not shown) known per se.

At its periphery the carrier plate 4 has a plurality of outwardly projecting paddles or spokes 14 integral with the main body of the carrier plate. The spokes are flat being substantially co-planar with the main body of the carrier plate and are substantially equi-angularly spaced bout a central axis X about which the assembly 2 is intended to rotate in use. Slots 16 space the spokes which have substantially radial opposite edges 18.

In the example shown there are thirty spokes 14 and thirty slots 16. Circumferentially each spoke 14 extends over about 7 degrees of arc and each slot 16 over about 5 degrees. If desired the number, size, shape and spacing of the spokes can be varied.

The spokes 14 are axially pliable in the sense of being leaf springs capable of flexing resiliently along directions substantially parallel to the axis X. This enables the carrier plate 4 at the spokes 14 to be sinuously flexible circumferentially.

Two substantially coincident and co-axial annular friction facings 20 and 22 are respectively bonded by an elastomeric material 24 and 25 to the opposite faces of each spoke 14. The elastomeric material 24 and 25 is adhered directly to faces of the friction facings 20 and 22 respectively and to the spokes 14. The elastomeric material 24,25 is preferably a heat resistant synthetic rubber, for example a silicone rubber. The rubber can be a room temperature vulcanising (called RTV) rubber. An example of such a silicone rubber is RTV 7057 produced and sold be Dow Corning. Another example is ELASTOSIL (Trade Mark) E14 produced by Waker-Chemi GmbH, and a further example is RTV 159 produced by General Electric Company of the U.S.A. However a silicone rubber of the fluoro-silicone rubber kind may also be used.

Desirably the rubber is of a kind which can withstand temperatures experienced by friction facings in use without the rubber degrading to lose its necessary bond strength or resilience. It is believed that the rubber should be able to withstand temperatures from approximately minus 30 degrees Centrigrade up to about 250 degrees Centigrade, but an ability to withstand higher temperatures is thought desirable, for example up to about 300 degrees Centrigrade or higher.

The elastomeric material 24 is in the form of a spiral bead or stripe which is continuous from its outermost end to its innermost end and is substantially centred on the axis X, and, in this example, comprises three turns 24A, 24B and 24C (see FIGS. 5 and 6). In FIG. 17 the elastomeric material 25 is also in the form of a continuous spiral bead or stripe and comprises three turns 25A, 25B and 25C. Both spirals are substantially similar except that each is of opposite hand to the other when viewed against its respective friction facing and thus of the same hand in the finished assembly. This is best seen in FIG. 6 where the spiral of elastomeric material 25 is superimposed as it would appear when both the friction facings are bonded onto the carrier plate.

Each friction facing 20,22 can be formed of any suitable friction material and may be of a non-asbestos type, but the facings are somewhat resilient such that each facing can flex or deform at least circumferentially.

The facings 20 and 22 may each be thin, for example 2.00 mm or less in axial thickness. However the friction facings may be thicker than 2.00 mm.

Due to the sinuous flexibility of the carrier plate 4 and the resilient and flexible nature of the friction facings 20 and 22, the whole of the friction facings and carrier plate assembly 2 is sinuously flexible circumferentially at the spokes 14.

The layers of elastomer 24 and 25 provide resilient cushioning between the friction facings and the paddles 14 and an overall axial cushioning between the friction facings. The layers 24 and 25 can each be of an appreciable thickness so that coupled with adequate flexibility and/or resilience of the friction facings will allow an appreciable local compression or axial compliance of the sandwich comprising both friction facings and elastomeric layers under an axial pressure applied to a relatively small area of each friction facing at any region of the whole area of the facing.

However when the assembly 2 forms part of a clutch driven plate in use in a motor vehicle clutch such as a diaphragm spring clutch, the subjective feel and quality of clutch re-engagements may be further enhanced by provision of further cushioning such as between the pressure plate and diaphragm spring and/or between the diaphragm spring and a clutch cover. That further cushioning may be a wavy wire fulcrum ring as in British Patent No 1 583 403.

Since the elastomeric bonding material 24 is to be used in a clutch driven plate it has to have both the aforesaid resistance to degradation by heat and also have good shear strength in both the mass of the elastomeric material and in the bonds it forms between itself and the friction facings and paddles.

To manufacture a friction material and carrier plate assembly which is in accordance with the invention, the spirals 24 and 25 of the elastomeric material in a fluid or paste form can be sandwiched between the carrier plate and friction facings and the whole subject to some axial pressure to ensure good area contact between the elastomeric material and respectively the carrier plate and friction facings, but preferably the friction facings are maintained a pre-determined distance apart. For example, removable spacing means can be disposed between the carrier plate and friction facings to ensure the elastomeric material layer between the plate and the respective friction facing has at least a minimum desired thickness. Then the elastomeric material is cured or vulcanised to render it solid and the spacing means are thereafter removed.

Figure 7:
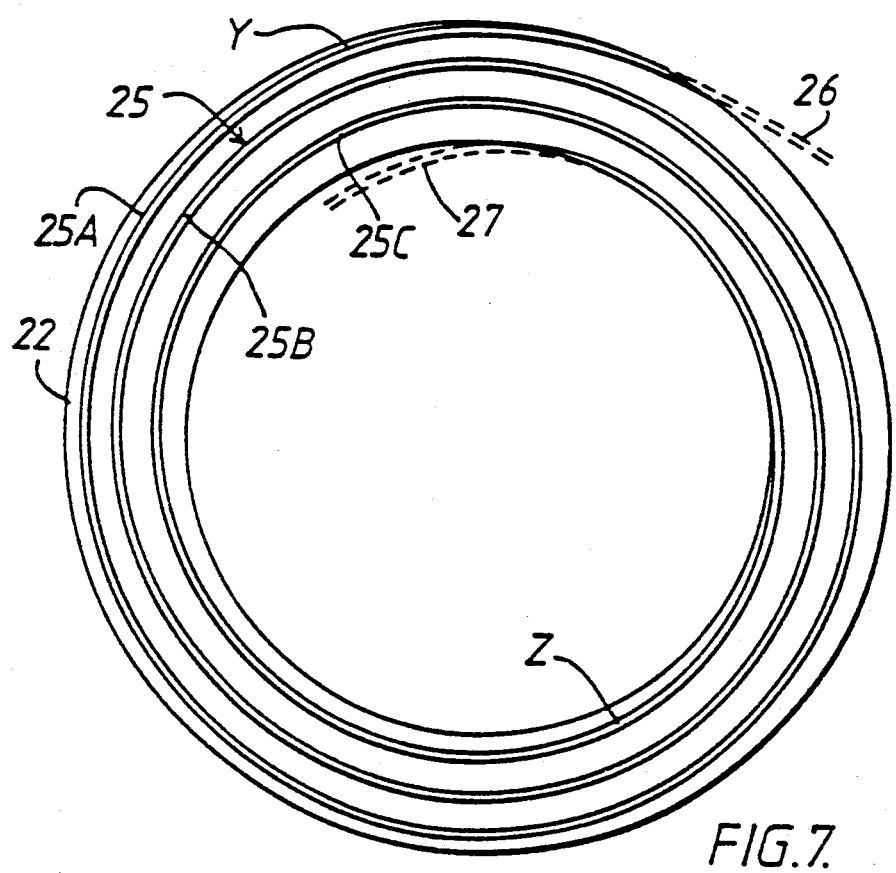
FIG. 7 is a plan view of the other friction facing with a spiral stripe of elastomer to be used in the assembly in FIG. 1.

As shown in FIGS. 5 to 7, during manufacture of the assembly 2 (FIG. 1) the elastomeric material is applied as a paste in substantially the form of a spiral stripe or bead 24 or 25, for example by an extruding method to each friction facing. Then the stripes on the facings are applied against the paddles 14 and vulcanised. In the case of an RTV rubber vulcanising is merely by subjecting the paste to the appropriate room temperature and humidity for sufficient time. For example RTV 7057 vulcanises in about forty-eight hours at a temperature of about 25 degrees Centrigrade and about 50% relative humidity.

Figure 3:
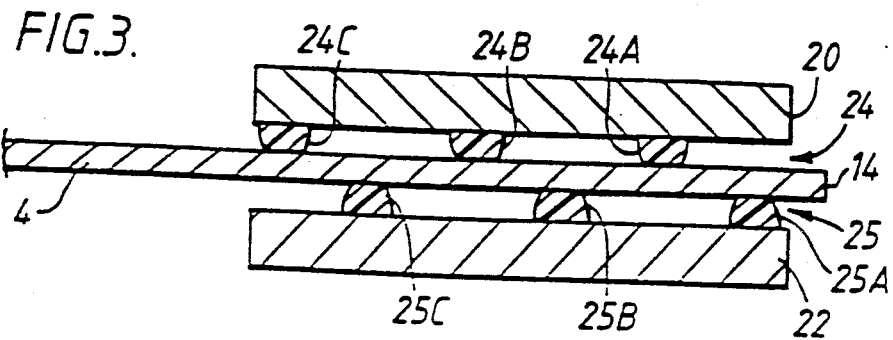
FIG. 3 is a section, on an enlarged scale, on line III—III in FIG. 1.

When the friction facings bearing the elastomer spirals and the carrier plate are laid up together, it is ensured that, relative to the axis X, the spiral 24 is angularly off-set, in this example by substantially 180 degrees, relative to the spiral 25 so that as shown in FIGS. 3 and 4 (and by the spiral 25 shown by the dash line in FIG. 6) each turn of one spiral is opposite the gap between adjacent turns of the other spiral. Thus at each slot 16 there is a generally radially extending passage (such a passage being indicated in FIG. 4 by the double headed arrows a). Those passages allow gases, emitted by the elastomeric stripes during curing of the elastomer, to escape. The passages also allow the ambient atmosphere to have full access to both complete opposite sides of each spiral stripe of elastomeric material. Furthermore by incorporating two spirals of elastomer which are of the same hand when in the assembly of friction facings and carrier plate and which are offset by substantially 180 degrees, the spirals do not cross at any point and there is no overlap which might create a blob of elastomer.

Each spiral stripe of elastomer can be applied to its respective annular friction facing by rotating the friction facing about its axis and simultaneously extruding the elastomer from a nozzle moving across the annular friction facing (for example substantially radially with respect to said axis) from the outer periphery of the facing towards the inner periphery or vice-versa. Conveniently the nozzle applies or lays one spiral stripe of elastomer onto a first friction facing whilst traversing from the outer periphery to the inner periphery of the facing and then the nozzle applies or lays another spiral stripe onto a second friction facing whilst traversing from the inner periphery to the outer periphery of the second facing. The second facing is then rotated through 180 degrees as described above before both the first and second facings are laid up onto the carrier plate.

Preferably each spiral of elastomer has a substantially constant cross-section (radially of the axis of the friction facing) throughout its length. This may be achieved by varying the rate at which elastomer is extruded so that the rate of extrusion is in a direct proportion to the distance of the nozzle from the axis of rotation of the friction facing and/or by varying the speed of rotation of the annular friction facing so that at any instant the speed is in an inverse proportion to the distance of the nozzle from the axis of rotation.

In an alternative method each friction facing can be maintained substantially stationary whilst a nozzle extruding the elastomer moves along a spiral path about the axis of the friction facing to lay down the spiral stripe of elastomer between the inner and outer peripheries of the friction facing. The nozzle can follow the spiral path in one direction for one friction facing and then follow the spiral path in the opposite direction for the next friction facing. If the nozzle is moved at a substantially constant linear speed, then the elastomer stripe extruded has a substantially constant cross-section (radially of the axis of the friction facing) throughout its length.

Also, preferably, throughout the length of a spiral of elastomer, the distance between adjacent turns is substantially constant. However there may be an advantage in ensuring that the width of the gap between turns of the spiral decreases in size the closer the spiral gets to the outer periphery of the annulus of friction material. This means the concentration of turns of the spiral varies across the annulus and is greater the nearer the approach to the outer periphery.

Any of the spirals, for example the spiral 25 of FIG. 7, could have its outer or inner end at Y or Z for example, instead of those ends coinciding with the outer and inner peripheries of the friction material as shown. That coincidence is ensured by commencing extrusion of the elastomer from the nozzle before the nozzle crosses the outer or inner periphery of the friction facing to begin laying the spiral on the friction facing and to continue extrusion after the complete spiral is laid and the nozzle has crossed the inner or outer periphery of the friction facing. Thus adjacent to the outer and inner peripheries the nozzle extrudes waste portions 26 and 27 of elastomer indicated by dash lines in FIG. 7.

Figure 8:
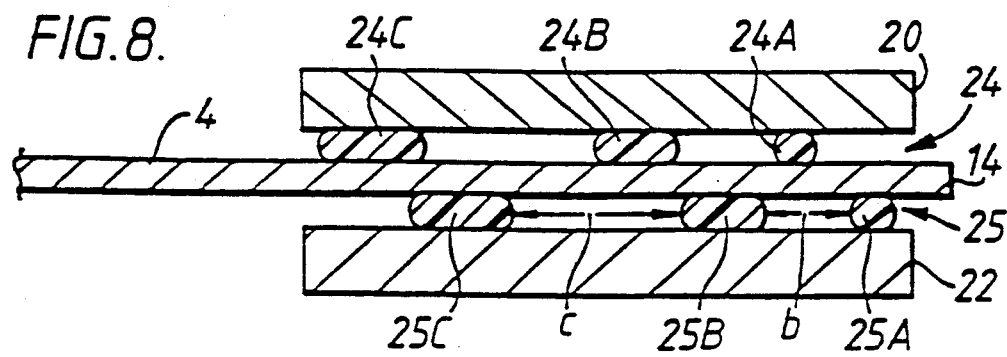
FIG. 8 is a view similar to FIG. 3 of a modification.

It may be desired, as shown in FIG. 8, for the radial cross-sectional area of the spiral of elastomer to vary from one end to the other of the spiral. For example, at any given position the radial cross-section of the spiral threat can be greater the nearer that position is to the radially inner end of the spiral. Therefore the cross-section shown of turn 25A in FIG. 8 is smaller than that shown of turn 25B which is smaller than that shown of turn 25C. To achieve a more uniform distribution of (externally applied) pressure radially across each friction facing, the radial gap between adjacent turns of a spiral decreases the further the gap is radially from the axis X such that gap b is less than gap c.

We claim:

1. A friction facing material and carrier assembly for a clutch driven plate, said assembly being intended for rotation about an axis and comprising at least one annular array of friction material, a carrier, and elastomeric material adhering the friction facing material to the carrier, wherein said elastomeric material is disposed as a stripe substantially in a spiral form extending about said axis and having a radially outermost end and a radially innermost end between which said spiral is substantially continuous.

2. An assembly as claimed in claim 1, wherein the elastomeric material is a silicone rubber.

3. An assembly as claimed in claim 1, wherein the spiral stripe is completely continuous from the radially outermost end of the spiral to the radially innermost end of said spiral.

4. An assembly as claimed in claim 1, wherein the friction material has an outer periphery and the outermost end of the spiral coincides with the outer periphery of the friction material.

5. An assembly as claimed in claim 1 wherein the friction material has an inner periphery and the inner end of the spiral coincides with the inner periphery of the friction material.

6. An assembly as claimed in claim 1 wherein said spiral comprises a plurality of turns, said turns defining at least one passage transverse to the turns, and two adjacent said turns defining a space therebetween, said passage allowing flow of gas into and out of the space.

7. An assembly as claimed in claim 1 wherein said annular array of friction facing material is an integral annulus of friction facing materials.

8. An assembly as claimed in claim 7, wherein said annulus is flexible.

9. An assembly as claimed in claim 1 the carrier having an outer periphery and paddles on said outer periphery, said friction facing material being adhered as aforesaid to the paddles.

10. An assembly as claimed in claim 9, wherein each paddle can flex resiliently.

11. An assembly as claimed in claim 1, said spiral stripe comprising a plurality of turns two of which define a radially inner gap and two of which define a radially outer gap, the radially outer gap being narrower than the radially inner gap radial gap.

12. An assembly as claimed in claim 1 wherein said carrier has opposite sides and there are two said annular arrays of friction material and each is adhered as aforesaid to a respective one of said opposite sides.

13. An assembly as claimed in claim 12, wherein each annular array of friction material is adhered to the carrier by a respective spiral and the spirals are each of opposite hand to the other when viewed against the respective friction facing.

14. An assembly as claimed in claim 13 wherein one of said spirals comprises two turns which define a gap therebetween and the other of said spirals comprises a turn which is opposite said gap.

15. A clutch driven plate which comprises an assembly as claimed in claims 1.

16. A method of making a friction facing and carrier assembly for a clutch driven plate, the assembly being intended for rotation about an axis, the assembly comprising a friction facing, a carrier and elastomeric material, the method comprising applying the elastomeric material to the friction facing so that the elastomeric material forms a substantially continuous spiral bead extending about the axis and applying the friction facing to the carrier so that the friction facing is adhered to the carrier by the elastomeric material.

17. A method according to claim 16, the method comprising providing a nozzle, extruding the elastomeric material from the nozzle and moving the nozzle, in a spiral relative to the friction facing to apply the elastomeric material to the friction facing.

18. A method as claimed in claim 17 wherein the elastomeric material is applied to the friction facing by extruding the spiral of elastomeric material from the nozzle moving between a radially innermost and radially outermost position relative to said axis as the annular array of friction material is rotated about said axis.

19. A method as claimed in claim 17 wherein the friction facing has inner and outer peripheries and the elastomeric material is applied to the friction facing by extruding the spiral of elastomeric material between the inner and outer peripheries from the nozzle moving in a spiral path about said axis.

20. A method as claimed in claim 19 wherein the friction facing is maintained substantially stationary and the nozzle moves at substantially constant linear speed along the spiral path.

21. A method as claimed in claims 17, the assembly comprising first and second friction facings, each having an inner periphery and an outer periphery, wherein the nozzle applies one spiral of elastomeric material to the second friction facing whilst traversing from the outer periphery to the inner periphery of the first facing and applies another spiral stripe onto the second friction facing whilst traversing from the inner periphery to the outer periphery of the second facing.

22. A clutch driven plate which comprises an assembly made by the method as claimed in claim 16.

23. A friction facing material and carrier assembly for a clutch driven plate, said assembly being intended for rotation about an axis and comprising at least one annular array of friction material having a radially inner edge and a radially outer edge, a carrier, and an elastomeric material adhering the friction facing material to the carrier, wherein said elastomeric material is an elongate strip extending from a first end to a second end thereof about the facing for at least one full turn and a lengthwise portion of said strip extending substantially from the radially inner edge to the radially outer edge of the facing.

24. A friction facing material and carrier assembly for a clutch driven plate according claim 23, wherein the elongate strip has a width substantially smaller than the radial width of the facing and the first end is located adjacent the radially inner edge of the facing while the second end is located adjacent the radially outer edge of the facing.

* * * * *